June 16, 1964
M. D. KINGHORN ETAL
3,137,548
EXPANSION ROOF LEVELER
Filed April 27, 1961
4 Sheets-Sheet 1
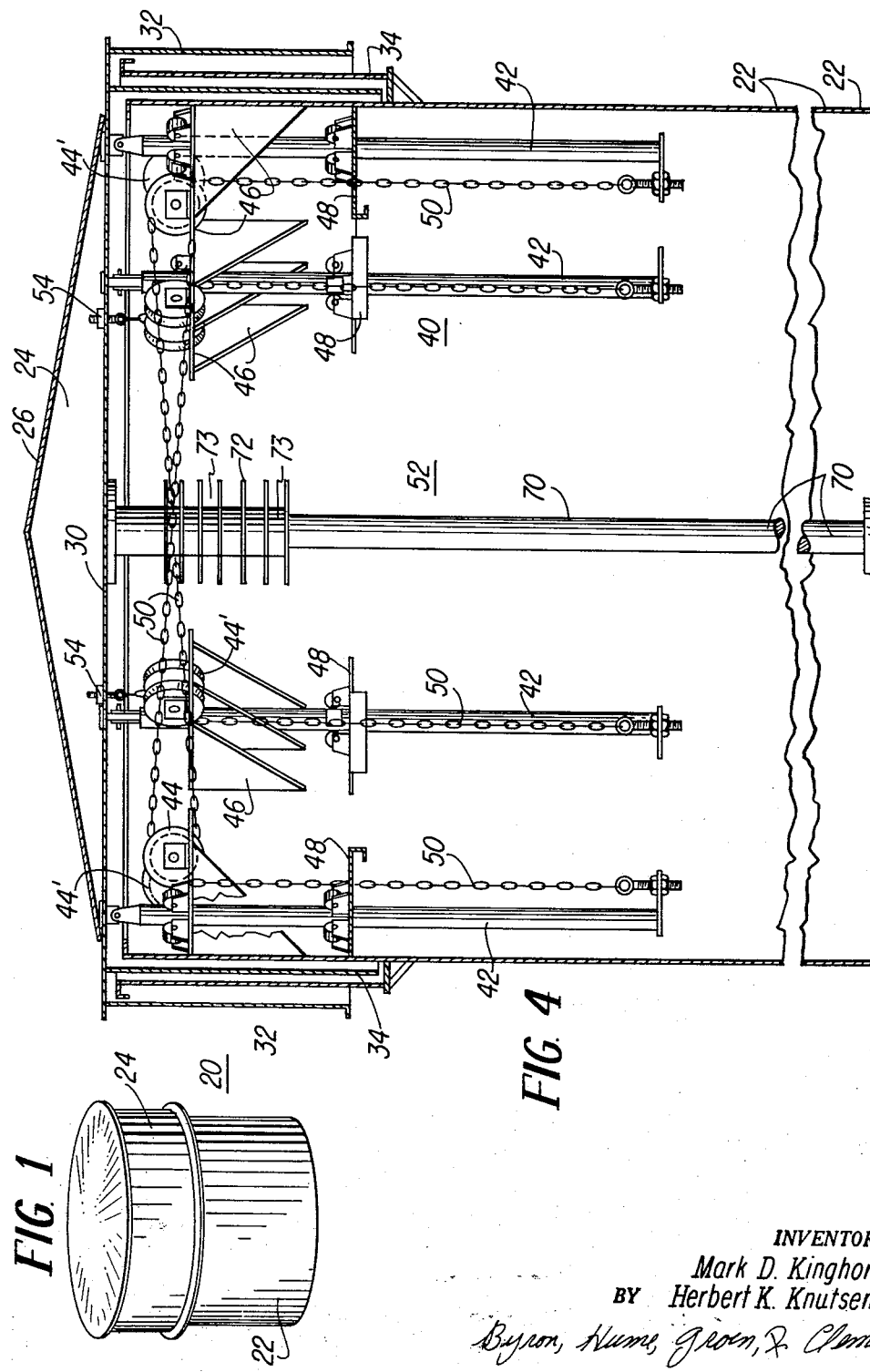
INVENTORS
Mark D. Kinghorn
Herbert K. Knutsen
BY
Byron, Hume, Groen, & Clement.
Attys.

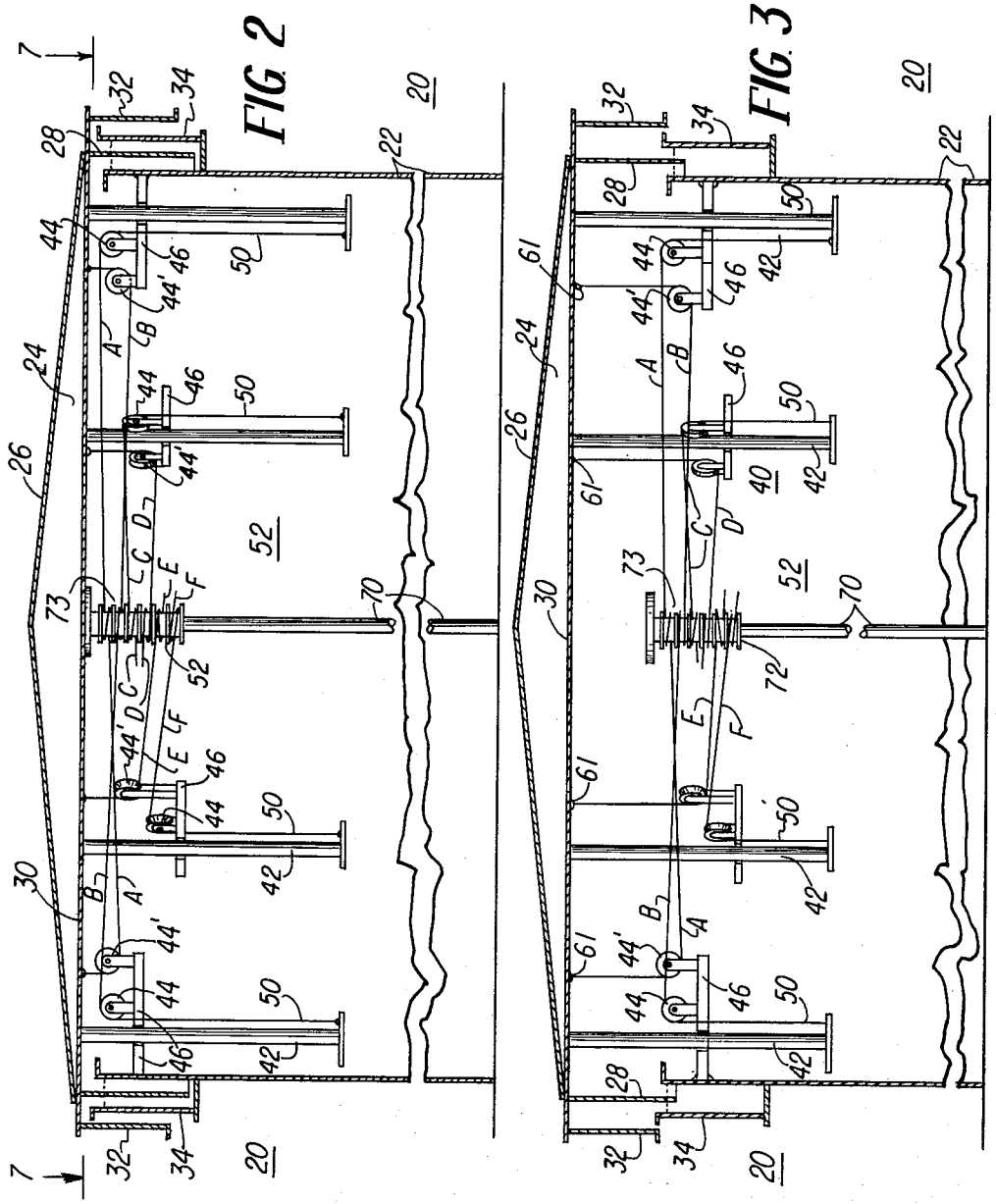

INVENTORS
Mark D. Kinghorn
Herbert K. Knutsen
BY
Byron, Hume, Groen, & Clement
Attys June 16, 1964

M. D. KINGHORN ETAL 3,137,548

EXPANSION ROOF LEVELER

Filed April 27, 1961

INVENTORS
Mark D. Kinghorn
BY Herbert K. Knutsen

Byron, Hume, Groen, & Clement
Attys.

United States Patent Office 3,137,548
Patented June 16, 1964

3,137,548
EXPANSION ROOF LEVELER
Mark D. Kinghorn, Schrerville, Ind., and Herbert K. Knutsen, Calumet City, Ill., assignors to Union Tank Car Company, Chicago, Ill., a corporation of New Jersey
Filed Apr. 27, 1961, Ser. No. 106,026
10 Claims. (Cl. 48—176)

This invention relates in general to a storage tank and in particular to a storage tank having an expansion roof devised to assure level movement of the expansion roof whether the movement be in an upward or downward direction.

It is the general object of the present invention to provide an improved storage tank with an improved expansion roof.

It is another object of the present invention to provide an improved storage tank with an expansion roof that is assured of level movement whether the movement be in an upward or downward direction.

It is yet another object of the present invention to provide an improved storage tank with an expansion roof that is so orientated and connected one portion to the other so as to assure the level movement of the expansion roof whether the movement be in an upward or downward direction.

Briefly, in a preferred embodiment of the invention, a storage tank particularly adapted for the storage of volatile liquids is provided with an expansion roof capable of movement in a vertical direction upwardly and downwardly around the storage tank responsive to changes of vapor pressure in the storage tank due to various factors as: degree of fullness, weather and so forth. Spaced portions of the expansion roof are tied together in such a manner that the tendency of one tied portion of the expansion roof to move results in a force being transferred to every other tied portion of the expansion roof to cause the other tied portions of the expansion roof to move in unison with the first mentioned portion, thus assuring that the entire expansion roof moves up and down around the storage tank in a level position.

The invention, both as to its organization and method of operation, taken with further objects and advantages thereof, will best be understood by reference to the following description taken in connection with the accompanying drawings, in which:

FIGURE 1 is a perspective view of a storage tank of the type embodying the features of the invention;

FIGURE 2 is a diagrammatic view of a storage tank of the type illustrated in FIGURE 1;

FIGURE 3 is a view substantially identical to FIGURE 2, but illustrating the expansion roof after it has moved upwardly;

FIGURE 4 is a cross sectional view of a storage tank of the type illustrated in FIGURE 1;

FIGURE 7 is a diagrammatical cross sectional plan view illustrating the manner in which spaced portions of the storage tank roof are tied together in the disclosed preferred embodiment of the invention; and FIGURE 8 is a sectional view of a modified form of the coordinating post of FIGURE 4, illustrating only one chain.

Figure 5:
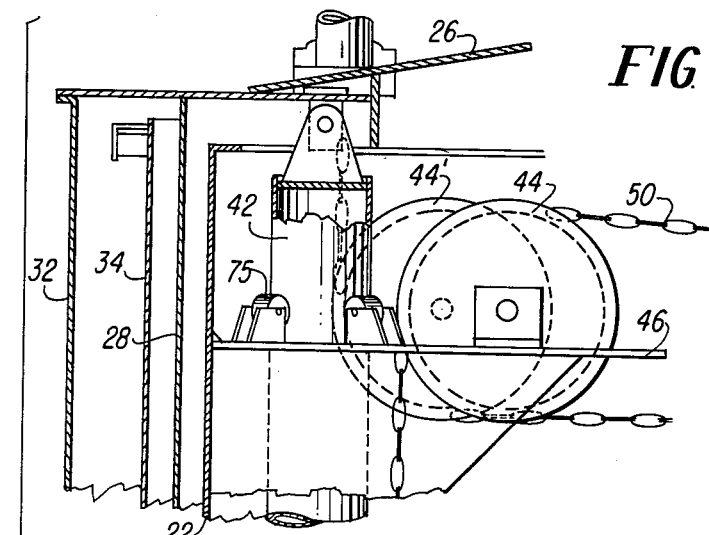
FIGURE 5 is an enlarged fragmentary view of the storage tank illustrated in FIGURE 4 particularly illustrating in detail a roof leveler post.

The storage tank with the expansion roof leveler arrangement, which will be described hereinafter, assure that the expansion roof moves up and down around the storage tank in a level manner. The roof leveler arrangement prevents the expansion roof from binding, or buckling, thus preventing the possible consequences thereof from occurring, including failure of the expansion roof to move resulting in undue vapor pressure being built-up in the storage tank, warping of the expansion roof itself and so forth.

Referring to the drawings, there is illustrated in FIGURE 1, a storage tank 20 having a storage tank body portion 22 generally adapted to store liquids and particularly adapted to store volatile liquids. The storage tank body portion 22 is provided with an expansion roof 24 positioned around the upper periphery of the storage tank body portion 22 and capable of movement in both the upward and downward direction responsive to vapor pressure build-up in the storage tank body portion 22.

Referring to FIGURES 2, 3 and 4 for a more detailed view of the storage tank including the expansion roof leveler arrangement embodying the features of the invention, there is illustrated the storage tank body portion 22 and the expansion roof 24. The storage tank body portion 22 is cylindrical in configuration and is ordinarily supported on a foundation (not shown) set in the earth. The expansion roof 24 is somewhat cylindrical in configuration and is provided with a slanted cover portion 26 and a substantially cylindrical body section or dip ring 28. A system (not shown) of girders including the girder 30 is provided to strengthen the roof and also to provide convenient tie points for the roof leveler arrangement, as will be seen later. A weatherhood 32 integrally formed with the expansion roof 24 is provided to protect the storage tank expansion roof seal from atmospheric conditions. A launder 34 is provided around the upper periphery of the storage tank body portion 22 and the launder 34 is filled with liquid, for example water, so as to provide a vapor seal to seal the inside of the storage tank 20 from the atmosphere.

As can be seen in the drawings, the launder 34 is filled almost to the top with a liquid, for example water, and the dip ring 28 of the expansion roof 24 is positioned within the launder 34 and it therefore can be seen that the dip ring 28 may move in a vertical direction, either upwardly or downwardly in the launder 34 a predetermined distance without breaking the liquid vapor seal, sealing the inside of the storage tank 20 from the atmosphere.

The roof leveler arrangement 40 is best illustrated in FIGURES 2, 3 and 4. The roof leveler arrangement 40 comprises: a plurality of regularly spaced roof leveler posts 42 secured to a system (not shown) of interlaced supporting girders including the girder 30; a plurality of leveler pulleys 44 and 44' pivotably affixed to a plurality of pulley supporting brackets 46 rigidly affixed to the walls of the storage tank body portion 22; a plurality of guide brackets 48 rigidly affixed to the walls of the storage tank body portion 22; a leveler coordinating post 52, a portion 72 of which is pivotably secured in the storage tank body portion 22; and a plurality of leveler chains 50 each extending from substantially the bottom of each roof leveler post 42 through the guide brackets 48, the pulley supporting brackets 46, over the leveler pulleys 44, one complete turn around the leveler coordinating post 52 in slots 73 provided therein for each leveler chain 50 and through the cooperating leveler pulleys 44' diametrically opposed to the leveler pulleys 44, through which the leveler chains 50 initially pass and finally up to the system (not shown) of interlaced supporting girders where the leveler chains 50 are attached by any convenient means such as the eye bolts 54.

The roof leveler arrangement 40 is so constructed that each portion of the expansion roof 24, tied to either the roof leveler posts 42 or the leveler chains 50, must move in unison either upwardly or downwardly, or they cannot move at all. FIGURES 2, 3 and 7 diagrammatically illustrate how each point on the expansion roof 24 tied to either the roof leveler posts 42 or the leveler chains 50 is compelled to move in unison.

In FIGURES 2, 3 and 7 for example, opposed pairs of roof leveler posts 42 are diagrammatically illustrated as being positioned diametrically opposite one another and attached to the expansion roof 24. A pair of leveler pulleys 44 and 44′ are pivotably attached to each pulley supporting bracket 46. Each pulley supporting bracket 46 is securely attached to the wall of the storage tank body portion 22 and provision is made within the pulley supporting brackets 46 to allow the roof leveler posts 42 to move vertically therethrough. A leveler coordinating post 52 is secured in the storage tank body portion 22 and the pivotable portion 72 thereof performs the function of transferring force to each portion on the expansion roof 24 tied to either the roof leveler posts 42 or the leveler chains 50, so as to insure that these portions move in unison either in an upward or downward direction. Leveler chains 50 are diagrammatically illustrated in FIGURES 2, 3 and 7 and extend from the bottom of the roof leveler posts 42 up around the leveler pulleys 44, one complete turn around slots 73 provided in the pivotable portion 72 of the leveler coordinating posts 52, under a cooperating leveler pulley 44′ and up to the girder system (not shown) including the illustrated girder 30 where the leveler chains 50 are secured to the expansion roof 24.

Assume that vapor pressure builds up in the storage tank 20 thereby exerting a force on the inside of the expansion roof 24. The expansion roof 24 will have a tendency to rise and, if unopposed, will rise and the dip ring portion 28 of the expansion roof 24 will move upward in the launder 34. The vapor seal between the outside atmosphere and the inside of the storage tank 20 will be intact as long as the dip ring portion 28 is in contact with the liquid in the launder 34. The expansion roof 24 may move, for example, from the position shown in FIGURE 2 to the position shown in FIGURE 3, in response to the build-up of vapor pressure in the storage tank 20. Each of the pulley supporting brackets 46 is positioned in a plane corresponding to the planes through which the leveler chains 50 pass through leveler pulleys 44 and 44′ and their respective slots in the coordinating post 52. The length of each leveler chain 50 is preferably the same and the tie points 61 to which the leveler chains 50 are attached and the position of the roof leveler posts 42 are symmetrical about the center line of the coordinating post 52.

When the expansion roof 24 of the storage tank 20 moves from the position illustrated in FIGURE 2 to the position illustrated in FIGURE 3, the length of the leveler chains 50 does not change nor does the position of the pulley supporting brackets 46 and the corresponding leveler pulleys 44 and 44′. Therefore, a redistribution of the length of the leveler chains 50 intermediate the bottom of the roof leveler posts 42 and the corresponding leveler pulleys 44, and the length of the leveler chains 50 intermediate the tie points 61 and the corresponding leveler pulleys 44′ must occur. As can be seen clearly from FIGURES 2 and 3, when the expansion roof 24 ascends or moves in an upward direction, the length of the leveler chains 50 intermediate the leveler pulleys 44 and the bottom of the roof leveler posts 42 is decreased and the length of the leveler chains 50 intermediate the tie points 61 and the leveler pulleys 44′ is increased.

If the expansion roof rises vertically in a level plane, the redistribution of the length of leveler chains 50 intermediate the last mentioned points will be straight forward and without incident. If, for example, the left hand end of the expansion roof 24, as viewed in FIGURES 2 and 3, tends to ascend more rapidly than the right hand end of the expansion roof 24, as viewed in FIGURES 2 and 3, force is exerted on the roof leveler posts 42 adjacent the right hand end of the expansion roof 24, through the leveler chains 50 from the left hand end of the expansion roof 24 and, specifically, from the left hand end of the expansion roof 24 through the tie points 61, the pulleys 44′, the leveler pulleys 44 and down to the bottom of the roof leveler posts 42.

It is not possible for the left hand side of the expansion roof 24 to move any faster than the right hand side of the expansion roof 24 as viewed in FIGURES 2 and 3, unless the leveler chains 50 expand or break. When only diametrically opposed portions of the expansion roof 24 are tied together, there is no need for the leveler coordinating post 52. However, it is possible for the two portions of the expansion roof interconnected together to move in unison with one another but relative to other portions of the expansion roof 24. This may result in a crown due to buckling being formed on the expansion roof 24 and the portions of the expansion roof 24 lying in a bisecting plane perpendicular to the upper ridge line defined by the formed crown would bind on the side wall of the body portion 22 of the storage tank 20, resulting in a warping of the dip ring 28 and the weatherhood 32 of the expansion roof 24.

Even if a plurality of diametrically opposed inter-connected roof leveler posts 42 and tie points 61 are provided on the expansion roof 24, there is still no assurance that all diametrically opposed portions of the expansion roof 24 will move in unison inasmuch as only the inter-connected portions of the tank are forced to move in unison, and the other portions of the tank not connected to those portions can move relative to the inter-connected portions. Therefore, there has been provided a leveler coordinating post 52 that is pivotably mounted in the storage tank body portion 22.

The leveler coordinating post 52 illustrated in the drawings comprises a supporting column 70 anchored to the bottom of the storage tank body portion 22 in any convenient manner and a coordinating upper slotted portion 72 pivotably mounted on said supporting column 70 in any convenient manner. A peripheral slot 73 is formed in the pivotable coordinating portion 72 for each leveler chain 50 utilized in the storage tank and, in the illustrated embodiment of the invention, six slots 73 are provided in the pivotable coordinating portion 72 of the leveler coordinating post 52. Each leveler chain 50 extends from its tie point 61, under its corresponding leveler pulley 44′, once around the pivotable coordinating slotted portion 72 through the peripheral slot 73 provided therefore, and then over its corresponding leveler pulley 44 and down to the bottom of the associated roof leveler post 42. Diametrically opposed portions of the expansion roof 24 are directly tied to one another through the median of the leveler chains 50. However, every portion of the expansion roof 24, provided with a tie point 61 and a roof leveler post 42, is connected to every other portion of the expansion roof 24, provided with a roof leveler post 42 and a tie point 61, because of the action of the leveler coordinating post 52 and the leveler chains 50, as will be seen hereinafter.

Figure 6:
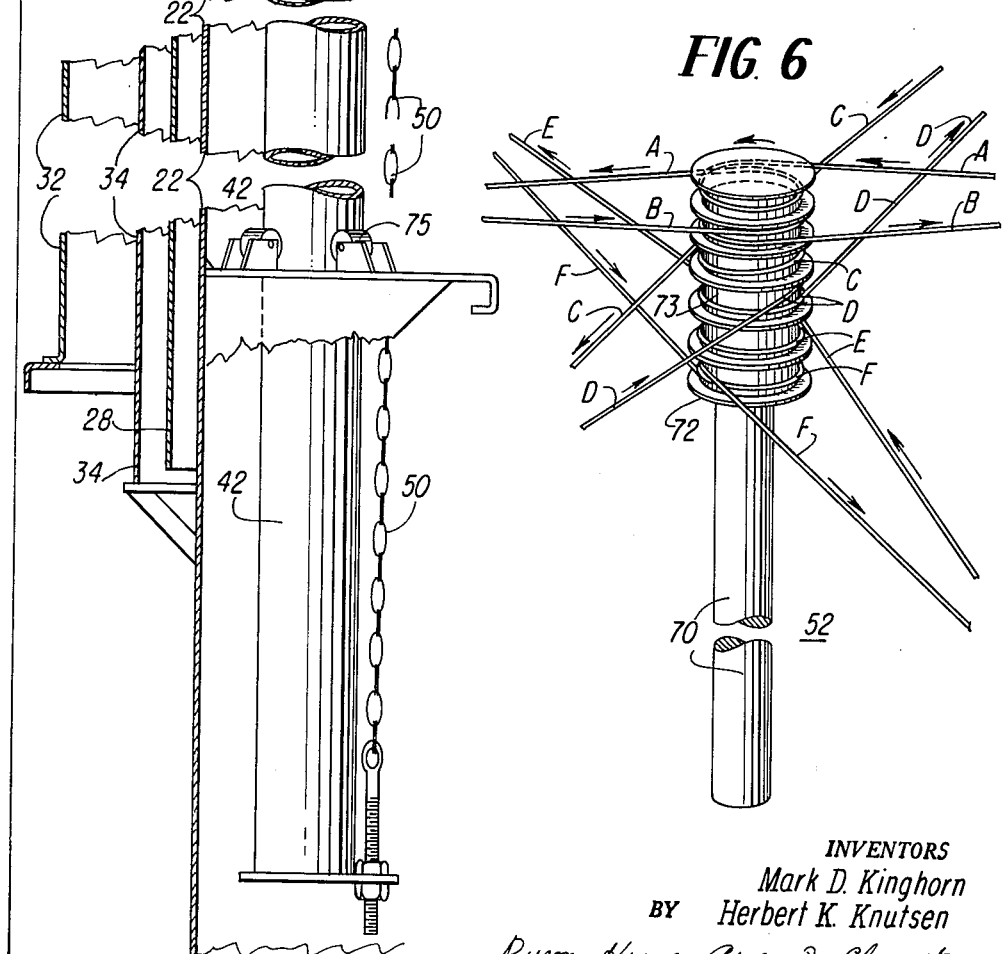
FIGURE 6 is an enlarged perspective view illustrating a preferred embodiment of a coordinating post adapted to assure that all tied portions of the storage tank roof move in unison.

Referring to the drawings in general, and FIGURE 6 in particular, it can be readily understood that the pivotable coordinating slotted portion 72 must rotate in unison with the several leveler chains 50 extending through the slots 73 as the expansion roof 24 moves upwardly or downwardly. A frictional driving force is transmitted to the pivotable coordinating portion 72 of the coordinating post 52 from any leveler chain 50 as the leveler chain 50 tends to move responsive to the tendency of the expansion roof 24 to move. This force is transferred through the pivotable coordinating portion 72 of the coordinating post 52 to every leveler chain 50 lying in and in frictional engagement with the slots 73 of the pivotable coordinating portion 72. When every leveler chain 50 travels the same distance as every other leveler chain 50 when the expansion roof 24 moves upwardly or downwardly as in the normal condition, the expansion roof 24 moves in an even undisturbed level manner.

However, if for some reason a portion of the expansion roof 24 tied to either a leveler chain 50, or a roof leveler post 42, resists movement in the same plane as any other portion of the expansion roof 24 tied to either the leveler chains 50, or the roof leveler posts 42, a frictional force is transmitted from each leveler chain 50 to the portion of the expansion roof 24 resisting such movement through the pivotable coordinating portion 72. The portion of the expansion roof 24 resisting coplaner movement is thereby forced to move in the same plane as the remainder of the tied portions of the expansion roof 24.

The leveler chain 50 must necessarily be wound around the pivotable coordinating portion 72 in the provided slots 73 in a predetermined manner as illustrated particularly in FIGURES 6 and 7, wherein the six leveler chains 50 are marked "A" through "F," respectively. Otherwise, the pivotable coordinating portion 72 will not rotate in response to the movement of the leveler chains 50 and serious defects may occur, including breaking of the leveler chains 50, or independent movement of the diametrically opposed inter-tied portions of the expansion roof 24, or even failure of the expansion roof 24 to move. As stated, FIGURES 6 and 7 illustrate the proper method of wrapping the peripherally spaced leveler chains 50 around the pivotable coordinating portion 72. The tendency of each leveler chain 50 must be to rotate the pivotable coordinating portion 72 in the same direction as the leveler chains move about the coordinating post 52 responsive to the vertical movement of the expansion roof 24.

If desired, the pivotable coordinating portion 72 of the coordinating post 52 may be replaced by a multiple helical sprocket having a full turn of helical teeth for each leveler chain 50 adapted to engage the leveler chains 50 to insure that all leveler chains 50 must move at once or not at all.

The illustrated embodiment of the invention is provided with several construction features, including the construction of the coordinating post 52. The coordinating post 52 is secured to the bottom of the storage tank 20 and is provided with a top supporting pedestal as clearly seen in FIGURES 2 through 4. When the expansion roof 24 is in a down position as illustrated in FIGURE 2, the expansion roof 24 rests on the top pedestal of the coordinating post 52 and is supported thereby.

Also, a plurality of peripherally spaced guide rollers 75 are conveniently positioned on both the pulley supporting brackets 46 and the guide brackets 48, as illustrated in FIGURE 6, so as to assure the smooth movement of the roof leveler posts 42 in the vertical direction through these last mentioned brackets as the expansion roof 24 moves upwardly and downwardly.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A roof leveler arrangement for a storage vessel comprising: a plurality of means for inter-connecting spaced portions of said roof, each of said means so connected that movement of one portion of said roof exerts a force upon the other inter-connected portion to urge said other inter-connected portion to the same level as said first mentioned portion, and a coordinating means intermediate each of said plurality of inter-connected spaced portions adapted to interconnect each means on the spaced portions of said roof, whereby each inter-connected portion on said roof moves vertically at the same speed and the same distance and thereby is maintained at the same relative level irrespective of vertical movement of the roof.

2. A roof leveler arrangement for a storage vessel comprising: a plurality of leveler elements attached to said roof, a movable tie line for each of said plurality of leveler elements attached to each of said leveler elements and to a point on said roof spaced from each of said leveler elements, a pair of pivot elements for each leveler element over which said tie lines pass and change direction, a coordinating element positioned intermediate said pairs of pivot elements coacting with said tie lines and adapted to physically interconnect each leveler element and each spaced point on said roof, whereby each leveler element and inter-connected point on said roof is tied together so that the roof is maintained in a level position during vertical movement of the roof.

3. A roof leveler arrangement for a storage vessel comprising: a plurality of diametrically opposed roof leveler posts spaced about the periphery of said roof, a tie line inter-connecting each of said roof leveler posts with a spaced point on said roof adjacent the roof leveler post diametrically opposed to each of said roof leveler posts, a pair of pulleys affixedly mounted to the wall of said storage vessel adjacent each roof leveler post, one of said pair of pulleys mounted adjacent each roof leveler post enabling the tie line attached to the diametrically opposed roof leveler post to change direction by approximately ninety degrees and the other of said pair of pulleys mounted adjacent each roof leveler post enabling the tie line attached to the adjacent leveler post to change direction by approximately ninety degrees and opposite to the change of direction of the tie line attached to the diametrically opposed roof leveler post, a coordinating post movably mounted in said storage vessel centrally of all said roof leveler posts and having a slot provided for each tie line, each of said tie lines being wrapped at least once around said coordinating post in its provided slot to prevent the leveler posts and roof from assuming any position other than a level position during vertical movement of said roof.

4. A roof leveler arrangement for a storage vessel comprising: a plurality of diametrically opposed roof leveler posts spaced about the periphery of said roof, a tie line inter-connecting each of said roof leveler posts with a spaced point on said roof adjacent the roof leveler post diametrically opposed to each of said roof leveler posts, a pair of pulleys affixedly mounted to the wall of said storage vessel adjacent each roof leveler post, one of said pair of pulleys mounted adjacent each roof leveler post enabling the tie line attached to the diametrically opposed roof leveler post to change direction and the other of said pair of pulleys mounted adjacent each roof leveler post enabling the tie line attached to the adjacent leveler post to change direction, a coordinating post movably mounted in said storage vessel centrally of all said roof leveler posts, each of said tie lines being non-slidably wrapped at least once around said coordinating post whereby the movement of any portion of said roof connected to either said leveler posts or said spaced points causes a corresponding movement of every other portion of said roof connected to either said leveler posts or said spaced points to thereby maintain the roof in a level position.

5. A roof leveler arrangement for a storage vessel comprising: a plurality of roof leveler posts spaced about the periphery of said roof, a tie line inter-connecting each of said roof leveler posts with a spaced point on said roof adjacent another roof leveler post, a plurality of pivot elements mounted on the wall of said storage vessel adjacent said plurality of roof leveler posts, said plurality of pivot elements mounted adjacent said plurality of roof leveler posts enabling the tie line attached to said another roof leveler post to change direction by approximately ninety degrees and also enabling the tie line attached to the adjacent leveler post to change direction by approximately ninety degrees and opposite to the change of direction of the tie line of said another leveler post, a coordinating post movably mounted in said storage vessel centrally of all said leveler posts and having a slot provided for each tie line, each of said tie lines being non-slidably wrapped at least once around said coordinating post in its provided slot whereby the movement of any portion of said roof connected to either said leveler posts or said spaced points causes a corresponding movement of every other portion of said roof connected to either said leveler posts or said spaced points.

6. A roof leveler arrangement for a storage vessel comprising: a plurality of roof leveler posts spaced about the periphery of said roof, a movable tie line inter-connecting each of said roof leveler posts with a spaced point on said roof adjacent another roof leveler post, a pair of pulleys mounted to the wall of said storage vessel adjacent each roof leveler post, one of said pair of pulleys mounted adjacent each roof leveler post enabling the tie line attached to said another roof leveler post to change direction by approximately ninety degrees, the other said pair of pulleys mounted adjacent each roof leveler post enabling the line attached to the adjacent leveler post to change direction by approximately ninety degrees and opposite to the change of direction of the tie line attached to said another roof leveler post, a coordinating post movably mounted in said storage vessel centrally of all said roof leveler posts, each of said tie lines being so connected with said coordinating post as to cause said coordinating post to rotate so as to move circumferentially the same distance as each of said tie lines move, so that the roof is prevented from assuming any position other than a level position during vertical movement of the roof.

7. A roof leveler arrangement for a storage vessel comprising: a plurality of diametrically opposed roof leveler posts spaced about the periphery of said roof, a movable tie line inter-connecting each of said roof leveler posts with a spaced point on said roof adjacent the roof leveler post diametrically opposed to each of said roof leveler posts, a pair of pulleys mounted to the wall of said storage vessel adjacent each roof leveler post, one of said pair of pulleys mounted adjacent each roof leveler post enabling the tie line attached to the diametrically opposed roof leveler post to change direction by approximately ninety degrees and the other said pair of pulleys mounted adjacent each roof leveler post enabling the tie line attached to the diametrically opposed roof leveler post to change direction by approximately ninety degrees, and a coordinating post movably mounted in said storage vessel centrally of all said roof leveler posts, each of said tie lines being so connected with said coordinating post as to cause said coordinating post to move the same distance as each of said tie lines whereby the movement of any portion of said roof connected to either said leveler posts or said spaced points causes a corresponding movement of every other portion of said roof connected to either said leveler posts or said spaced points.

8. A roof leveler arrangement for a storage vessel comprising: a plurality of roof leveler elements attached to said roof and normally extending below a predetermined plane in said storage vessel, a movable tie line for each roof leveler element attached at one end to a spaced point on said roof and at the other end to said roof leveler element below said predetermined plane, a pair of spaced pivot members for each tie line connected above the plane in said storage vessel at which said tie lines are connected to said roof leveler elements enabling each of said tie lines to change direction at least twice so as to extend in substantially the same direction adjacent each end of said tie lines, and a coordinating post movably mounted in said storage vessel centrally of all said roof leveler posts and having a slot provided for each tie line, each of said tie lines being wrapped at least once around said coordinating post in its provided slot so that the roof is maintained in a substantially horizontal position during vertical movement of the roof.

9. A roof leveler arrangement for a storage vessel comprising: a storage vessel, an expansion roof, said expansion roof having a plurality of roof leveler elements attached thereto and normally extending below a predetermined plane in said storage vessel, a tie line for each roof leveler element attached at one end to said roof and at the other end to said roof leveler element below said predetermined plane, a plurality of spaced pivot members attached to said storage vessel in a plane above the plane in which said tie lines are attached to said roof leveler elements enabling said tie lines to change direction so as to extend in substantially the same direction adjacent each end of said tie line, and a coordinating post movably mounted to said roof intermediate said spaced pivot members, each of said tie lines being so connected with said coordinating post so as to cause said coordinating post to rotate so as to move the same distance as each of said tie lines, thereby preventing the roof from assuming a position other than a horizontal position during its vertical movement.

10. A roof leveler arrangement for a storage vessel comprising: a plurality of leveler elements peripherally spaced and attached to said roof, a movable tie line for each of said plurality of leveler elements attached to each of said leveler elements and a point on said roof spaced from each of said leveler elements, a pair of pivot elements for each leveler element over which said tie lines pass and change direction, a coordinating element positioned intermediate said pairs of pivot elements adapted to exert a force on each leveler element and each spaced point on said roof responsive to the movement of said roof whereby the roof is prevented from obtaining a position other than a horizontal position irrrespective of the application of unbalancing forces to the roof.

References Cited in the file of this patent
UNITED STATES PATENTS

| | | |
|---|---|---|
| 2,280,657 | McCandliss | Apr. 21, 1942 |
| 2,280,768 | Graver | Apr. 21, 1942 |
| 2,360,692 | Larsen | Oct. 17, 1944 |
| 2,452,146 | Plummer | Oct. 26, 1948 |
| 2,497,851 | Allen | Feb. 21, 1950 |